(12) United States Patent
Foti

(10) Patent No.: US 7,926,814 B2
(45) Date of Patent: Apr. 19, 2011

(54) ANNULAR SEAL ASSEMBLY FOR INSERTION BETWEEN TWO RELATIVELY ROTATABLE MEMBERS AND METHOD FOR ITS USE

(75) Inventor: Claudio Foti, Poirino (IT)

(73) Assignee: Aktiebolaget SKF, Gothenburg (SE)

( * ) Notice: Subject to any disclaimer, the term of this patent is extended or adjusted under 35 U.S.C. 154(b) by 401 days.

(21) Appl. No.: 12/077,724

(22) Filed: Mar. 20, 2008

(65) Prior Publication Data

US 2008/0272557 A1    Nov. 6, 2008

(30) Foreign Application Priority Data

Mar. 21, 2007    (EP) .................................. 07425162

(51) Int. Cl.
*F16J 15/32*    (2006.01)
(52) U.S. Cl. ......... 277/309; 277/353; 277/551; 277/572
(58) Field of Classification Search .................. 277/353, 277/549, 551, 571, 572, 309
See application file for complete search history.

(56) References Cited

U.S. PATENT DOCUMENTS

| 6,273,428 | B1 * | 8/2001 | Sassi | 277/348 |
| 7,464,939 | B2 * | 12/2008 | Matsui | 277/317 |

FOREIGN PATENT DOCUMENTS

| DE | 37 39 513 | 6/1989 |
| DE | 44 22 853 | 1/1996 |
| DE | 197 17 199 | 11/1997 |
| EP | 0 157 904 | 9/1987 |
| EP | 0 357 875 | 3/1990 |
| EP | 940610 A2 * | 9/1999 |
| EP | 1 406 025 | 4/2004 |
| EP | 1 650 481 | 4/2006 |
| GB | 2 192 436 | 1/1988 |

* cited by examiner

*Primary Examiner* — Shane Bomar
*Assistant Examiner* — Robert E Fuller
(74) *Attorney, Agent, or Firm* — Ladas & Parry LLP

(57) ABSTRACT

A seal assembly including first and second rigid shields and a sealing member carried by the first shield and having a first and second annular sealing lip in sealing engagement with respective sliding surfaces of the second shield. The first sealing lip carries in a radial seat thereof a toroidal spring exerting a radially eccentric thrust on the first sealing lip with respect to an elastic hinge defined by a common root portion of the lips, having a center of rotation located along a line extending through a V-shaped sealing edge of the first lip and forming a 20° to 60° angle with a radial plane. The root portion is defined between two opposite annular recesses having a U-shaped cross-section and bottom walls facing each other, substantially aligned along the aforementioned line.

7 Claims, 1 Drawing Sheet

ANNULAR SEAL ASSEMBLY FOR INSERTION BETWEEN TWO RELATIVELY ROTATABLE MEMBERS AND METHOD FOR ITS USE

The present invention relates to an annular seal assembly for a device comprising two relatively rotatable members such as a water pump or an electric household appliance, in particular for assembly to a washing machine drum drive shaft, to provide sealing between two relatively rotating members defined by the shaft itself and the wash tub in which the drum rotates, to prevent leakage of a wash fluid from the tub, on the one hand, and, on the other, to protect a bearing of the drum drive shaft from infiltration by water, while at the same time ensuring optimum sealing with a minimum amount of friction and noise.

BACKGROUND OF THE INVENTION

EP 1514966A1 provides numerous seal assembly solutions for preventing water leakage from the tub at the through seat for the drive shaft of the drum, and for protecting the bearings of the drum shaft. In all these solutions, the sealing assemblies have one or more sealing lips, and provide for exclusively radial sealing directly on the drum drive shaft. In some embodiments, one of the sealing lips is loaded by a toroidal spring for increasing the radial pressure exerted by the lip; and, in all cases, the seal assembly must be protected at least partly against contact with the wash fluid, on the side facing the tub, by a rigid plastic shield which does not cooperate with any of the sealing lips.

The sealing assemblies illustrated in EP 1514966A1, and described briefly above, have numerous drawbacks. Firstly, friction is severe, on account of the relatively high contact pressure exerted by the sealing lips, especially when spring-loaded, thus resulting in high energy consumption of the appliance, and, above all, in rapid wear of the sealing lips. Secondly, the seal assembly and protective shield are relatively bulky. And, lastly, in an operating environment such as the connection between the tub and drum of a washing machine—characterized by severe vibration, frequent inversion of the rotation direction of the drum, and widely varying rotation speeds (from a few rpm during the wash cycles to over 1000 rpm during the spin cycle)—the seal assemblies described are extremely noisy.

SUMMARY OF THE INVENTION

It is an object of the present invention to provide a seal assembly specially designed for use in electric household appliances, and therefore low-cost manufacture, and which provides for eliminating the aforementioned drawbacks. In particular, a seal assembly which provides for excellent sealing of the wash fluid in a washing machine tub, involves very little friction, thus reducing energy consumption, involves little or no noise, and is compact while at the same time being straightforward in design. It is a further object of the invention to provide a seal assembly of the above type, in which a high degree of sealing efficiency remains substantially unchanged even alongside gradual wear of the sealing lips.

According to the present invention, there is provided a seal assembly for insertion between two relatively rotatable members and specifically designed for application on electric household appliances, e.g. insertable between two relatively rotating members with a wash fluid in between, as claimed in the attached Claims.

More specifically, the seal assembly according to the invention comprises a first rigid shield having an annular sealing member of elastomeric material; and a second rigid shield mounted facing the first and having respective sliding surfaces for a first and a second annular sealing lip of the annular sealing member. The rigid shields have an L-shaped radial section, and the first and second sealing lip project from a flange portion of the first shield towards a flange portion and a sleeve portion, respectively, of the second shield to exert axial and radial sealing pressure, respectively, on the sliding surfaces.

The first lip has a radial seat facing the opposite way to the second lip and housing a toroidal spring, which exerts a radial thrust on the first lip eccentrically with respect to an elastic hinge defined by a common root portion of the first and second lip, and having a centre of rotation located along a line extending through a V-shaped sealing edge of the first lip and forming a 20° to 60° angle γ with a radial plane.

According to one aspect of the invention, the first and second lip extend obliquely with respect to the sliding surfaces from the common root portion, and in opposite directions substantially along a line parallel to said line through the sealing edge of the first lip. In combination with the above, the second lip has a V-shaped sealing edge perpendicular to the V-shaped sealing edge of the first lip and defined by a radially inner, undulated, circumferential groove of the second lip.

More specifically, the undulated, circumferential groove defining the sealing edge is of the same type described in EP0940610B1, the pertinent parts of which are included herein purely by way of reference.

The root portion is defined between a first and second annular recess of the sealing member, which are opposite each other, have a U-shaped radial section, and are defined by respective rounded bottom walls having their convexities facing each other, and which are substantially aligned along said line through the sealing edge of the first lip.

A seal assembly is thus surprisingly obtained, which provides for excellent sealing, both of the wash fluid and the lubricating grease in which the rolling bearing of the drum drive shaft is immersed in use. In addition, sliding friction of the sealing lips is reduced, and, above all, the seal assembly is silent-operating in all conditions, and is of compact design. Moreover, by providing for two-way, radial and axial, sealing by lips which to a certain extent interact with each other, sealing efficiency remains substantially unchanged over most of the working life of the sealing lips, and wear of the sealing lips is reduced.

The position in which the above seal assembly is mounted is also an integral part of the invention, and assists in achieving the surprising advantages referred to above.

The invention therefore also relates to use of the above seal assembly, as claimed in the attached Claims.

In other words, the invention combines, in innovative manner, the technology described in EPO940610B1 for one of the two radial-sealing lips, and the technology described in EPO980999B1, the pertinent parts of which are also included herein purely by way of reference. According to the invention, however, the latter technology—specifically devised for sealing between the casing and drive shaft of an internal combustion engine—is applied to a completely different operating environment (in terms of operating temperature, problems, speed) defined by the tub/drum assembly of a washing machine, and is adapted and combined with the technology of EPO940610B1, by combining an undulated-sealing-edged radial sealing lip with a constant-pressure axial sealing lip unaffected by any positioning errors at the assembly stage, to achieve a whole series of unexpected results and advantages in terms of improved performance in the particular operating environment involved, and, above all, in terms of silent operation.

BRIEF DESCRIPTION OF THE DRAWING

A non-limiting embodiment of the present invention will be described by way of example with reference to the accompanying drawings, of which.

DETAILED DESCRIPTION OF THE INVENTION

Figure 1:
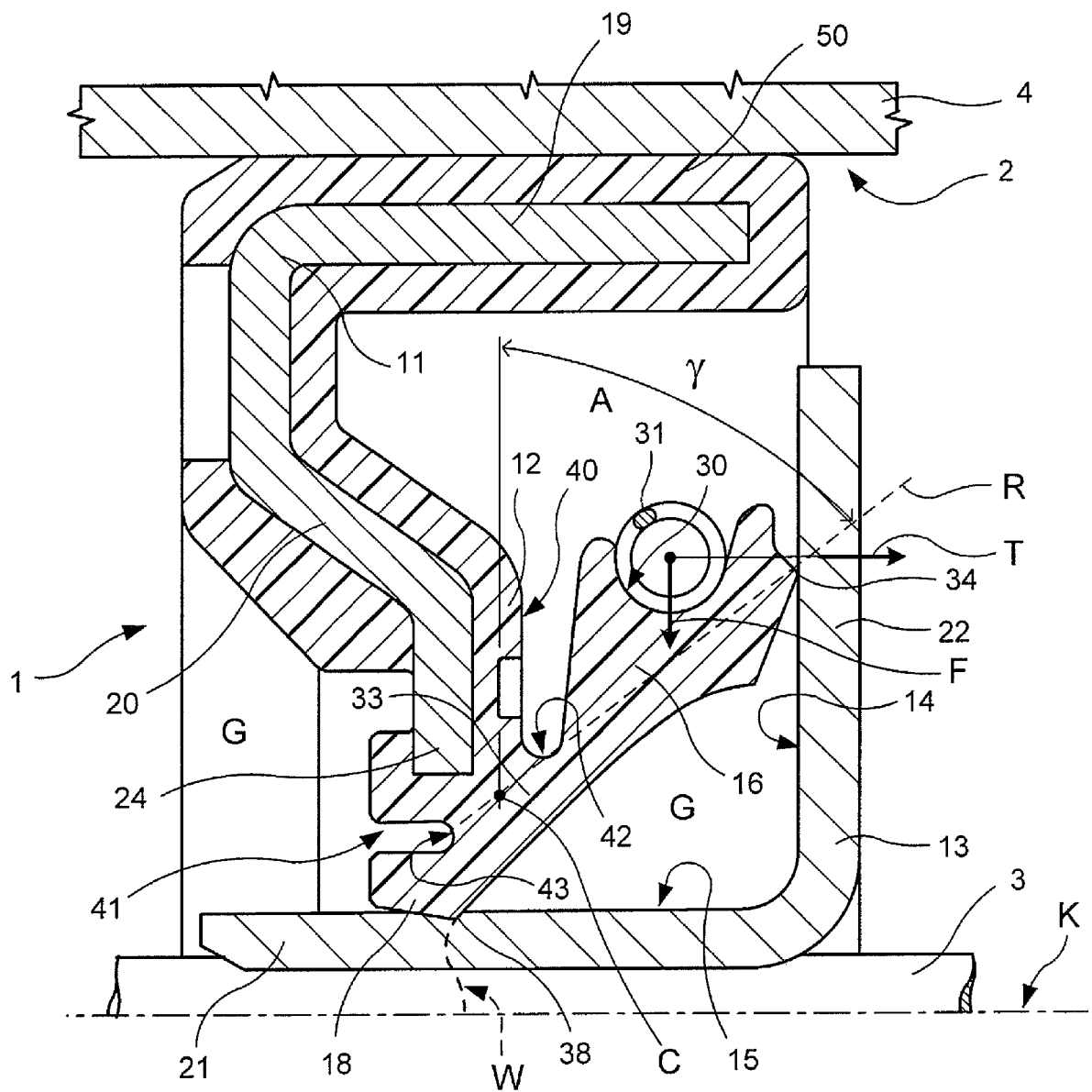
FIG. 1 shows a longitudinal radial section of a seal assembly in accordance with the invention, and schematically, use of the seal assembly according to the invention.

Number 1 in FIG. 1 indicates a seal assembly, for an electric household appliance, insertable inside a gap 2 defined between two relatively rotating members 3, 4, between which a wash fluid, indicated A, is present in use.

Figure 3:
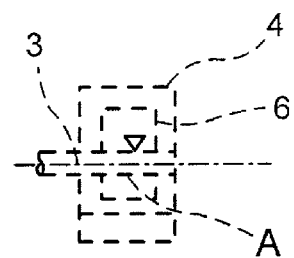
FIG. 3 shows a wash tub of an electric household appliance in which the seal assembly in accordance with the invention can be used.

With reference to the dash-line diagram of FIG. 3, seal assembly 1 is designed, according to the invention, for use in a washing machine (not shown), and for insertion between a wash tub 4—housing a rotating laundry drum 6—and a shaft 3, which rotates with respect to tub 4, is partly immersed, in use, in the wash fluid A filling tub 4, and supports drum 6 in projecting manner through an opening formed in the rear wall of tub 4 and defining gap 2 to be sealed, in use, by seal assembly 1.

Figure 2:
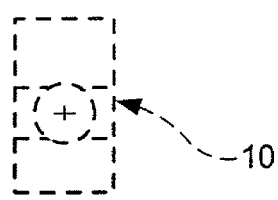
FIG. 2 shows a known rolling bearing for use with the seal assembly in accordance with the invention.

Gap 2, or a gap immediately adjacent to it, e.g. in a supporting structure of drum 6, also houses at least one known rolling bearing 10 (FIG. 2) supporting shaft 3, and which normally operates immersed n a lubricating fluid G, e.g. mineral grease, and must be protected against accidental contact with wash fluid A; which function is also performed by seal assembly 1 according to the invention.

Seal assembly 1 comprises a first rigid shield 11 having an annular sealing member 12 of elastomeric material; and a second rigid shield 13 mounted facing the first and having respective sliding surfaces 14, 15 for a first annular sealing lip 16 and a second annular sealing lip 18 of annular sealing member 12.

Rigid shields 11 and 13 have an L-shaped radial section. Shield 11 comprises a substantially cylindrical sleeve portion 19 for fitment to member 4; and a flange portion 20 substantially perpendicular to portion 19 and to an axis of symmetry K of annular sealing member 12 (and also of shields 11, 13), and which, in the example shown, is pressed to form an S-shaped radial section parallel to axis K.

Similarly, shield 13 comprises a cylindrical sleeve portion 21 for fitment to shaft 3, and which, in use, is concentric with and faces sleeve portion 19 on the radially inner side; and a flange portion 22 perpendicular to portion 21 and located on the opposite side to and facing flange portion 20. Annular sealing member 12 is located between flange portion 20 and flange and sleeve portions 22 and 21 bearing surfaces 14 and 15, and is supported by and projects partly from flange portion 20.

More specifically, from a radially inner annular edge 24 of flange portion 20—defining a circular passage, through which shaft 3 is inserted and sleeve portion 21 is partly inserted, in use—first lip 16 and second lip 18 project respectively towards flange portion 22 and sleeve portion 21 of shield 13 to exert axial sealing pressure on sliding surface 14 and radial sealing pressure on sliding surface 15 respectively.

Lip 16 has a radial seat 30 facing the opposite way to lip 18 and housing a toroidal spring 31, which exerts a radial thrust F (shown by the arrow) on lip 16 eccentrically with respect to an elastic hinge defined by a common root portion 33 of lips 16 and 18, and having a centre of rotation C located along a line R (shown by the dash line) extending through a V-shaped sealing edge 34 of lip 16 and forming a 20° to 60° angle γ with a radial plane (in the example shown, parallel to the radial extension of flange portions 20 and 22). Lip 16, by means of edge 34, is thus able, as described in EPO980999B1, to exert substantially constant axial sealing pressure T on surface 14, even in the event of variations in the relative axial position of shields 11 and 13.

According to one aspect of the invention, lips 16 and 18 extend obliquely with respect to sliding surfaces 14 and 15 from common root portion 33, and in opposite directions substantially along a line parallel to line R through sealing edge 34 of lip 16. That is, lip 16 extends from root portion 33 obliquely and at a predetermined angle with respect to surface 14, and lip 18 extends from root portion 33 obliquely with respect to surface 15 and at such a predetermined angle that lips 16 and 18 form, longitudinally (i.e. parallel to line R), a substantially 180° angle.

According to a further aspect of the invention, in combination with the above characteristic, lip 18 has a V-shaped sealing edge 38 perpendicular to the V-shaped sealing edge 34 of lip 16 and defined by an undulated, circumferential groove W formed radially inwards on lip 18 in accordance with the teachings of EPO940610B1.

According to yet a further aspect of the invention, root portion 33 is defined between a first annular recess 40 and a second annular recess 41 of sealing member 12, which are opposite each other, have a U-shaped radial section, and are defined by respective rounded bottom walls 42, 43 with their convexities facing each other. Though oriented differently, bottom walls 42 and 43 are substantially aligned along line R (in the sense that line R extends through or at least touches them).

Moreover, at bottom walls 42, 43, U-shaped annular recesses 40, 41 are substantially perpendicular to each other. More specifically, recess 40 is substantially perpendicular to axis of symmetry K, with bottom wall 42 facing sleeve portion 21, and recess 41 is substantially parallel to axis of symmetry K, with bottom wall 43 facing flange portion 22.

Annular sealing member 12 preferably extends along flange portion 20 of shield 11, and covers sleeve portion 19 of shield 11 to define a static sealing member 50 radially outwards on sleeve portion 19.

Finally, according to the present invention, second lip 18 cooperates, in use, with sliding surface 15 of shield 13 with a relatively high degree of radial interference (shown out of scale in the drawing). In the specific operating environment referred to, however, undulated groove W defining V-shaped sealing edge 38 is designed to produce, in use, a hydrodynamic effect, which reduces friction of sealing edge 38 on sliding surface 15 (tests conducted by the Applicant's technicians show a reduction in friction of 20% or more). This unpredictable effect is probably due to the normal "pumping" effect of groove W, which, in this case, as opposed to keeping out external contaminants, as in EPO940610B1, is exploited for an entirely different purpose.

Finally, according to the teachings of the invention, seal assembly 1 described is used in unconventional manner, contrary to the teachings of the state of the art, in which the spring-loaded lip is always positioned facing a contaminant-free environment.

According to the invention, in fact, seal assembly 1 is mounted with lip 16 facing an environment occupied, in use, by wash fluid A, which, in use, may come/comes into contact with lip 16, on the radial seat 30 side, and may also reach recess 40; and with lip 18 facing rolling bearing 10 supporting shaft 3, so as to contact, in use, lubricating grease G at least on the U-shaped recess 41 side.

Finally, as stated, lip 18 is mounted on sliding surface 15 with a relatively high degree of interference, so that, in use, undulated groove W produces said hydrodynamic effect to reduce the friction of sealing edge 38 on surface 15.

The invention claimed is:

1. A seal assembly for insertion between two relatively rotatable members between which a wash fluid is present, and comprising a first rigid shield having an annular sealing member of an elastomeric material, and a second rigid shield mounted facing the first rigid shield and having respective sliding surfaces for a first and a second annular sealing lip of the annular sealing member; wherein the rigid shields have an L-shaped radial section, and the first and second annular sealing lips project from a flange portion of the first rigid shield towards a flange portion and a sleeve portion, respectively, of the second rigid shield to exert axial sealing pressure and radial sealing pressure, respectively, on said sliding surfaces; and wherein the first annular sealing lip has a radial seat facing the opposite way to the second annular sealing lip and housing a toroidal spring, which exerts a radial thrust on the first annular sealing lip eccentrically with respect to an elastic hinge defined by a root portion common to the first and second annular sealing lips, and having a center of rotation located along a first line extending through a V-shaped sealing edge of the first annular sealing lip and forming a 20° to 60° angle with a radial plane; wherein said first and said second annular sealing lips extend obliquely with respect to said sliding surfaces from said common root portion, and in opposite directions substantially along a second line parallel to said first line extending through the sealing edge of the first annular sealing lip; wherein said root portion is defined between a first and a second annular recess of the annular sealing member, which are opposite each other, have a U-shaped cross-section, and are defined by respective rounded bottom walls having their convexities facing each other, and which are substantially aligned along said first line.

2. The seal assembly as claimed in claim 1, wherein said second annular sealing lip has a V-shaped sealing edge perpendicular to the V-shaped sealing edge of the first annular sealing lip and defined by a radially inner, undulated, circumferential groove.

3. The seal assembly as claimed in claim 2, wherein said second annular sealing lip cooperates with said respective sliding surface of the second rigid shield with an interference fit; said undulated groove defining the V-shaped sealing edge of the second annular sealing lip, being designed to produce a hydrodynamic effect which reduces friction of the sealing edge on the sliding surface.

4. The seal assembly as claimed in claim 1, wherein said annular sealing member extends along the flange portion of the first rigid shield, and covers a sleeve portion of the first rigid shield to define a static sealing member radially outwards on the sleeve portion of the first rigid shield.

5. The seal assembly as claimed in claim 1, wherein said first and said second annular recesses are substantially perpendicular to each other at their respective bottom walls; the first annular recess being substantially perpendicular to an axis of symmetry of the annular sealing member, and the second annular recess being substantially parallel to said axis of symmetry.

6. A method comprising the steps of:
inserting a seal assembly as claimed in claim 1 between two relatively rotatable members between which a wash fluid is present;
mounting said first annular sealing lip to face an environment occupied by a wash fluid which comes into contact with said first annular sealing lip on the side facing said radial seat of the toroidal spring, and with said first annular recess; and
mounting said second annular sealing lip to face a rolling bearing of a drive shaft of a drum, so as to contact lubricating grease at least on the side facing said second annular recess.

7. The method as claimed in claim 6, further comprising:
mounting said second annular sealing lip to contact a respective sliding surface of the second rigid shield with an interference; and
producing, by means of an undulated groove defining a V-shaped sealing edge of the second annular sealing lip, a hydrodynamic effect which reduces friction of the sealing edge on the sliding surface.

* * * * *